Feb. 13, 1934. M. M. LORY 1,946,912
TIRE TOOL
Filed Feb. 12, 1932
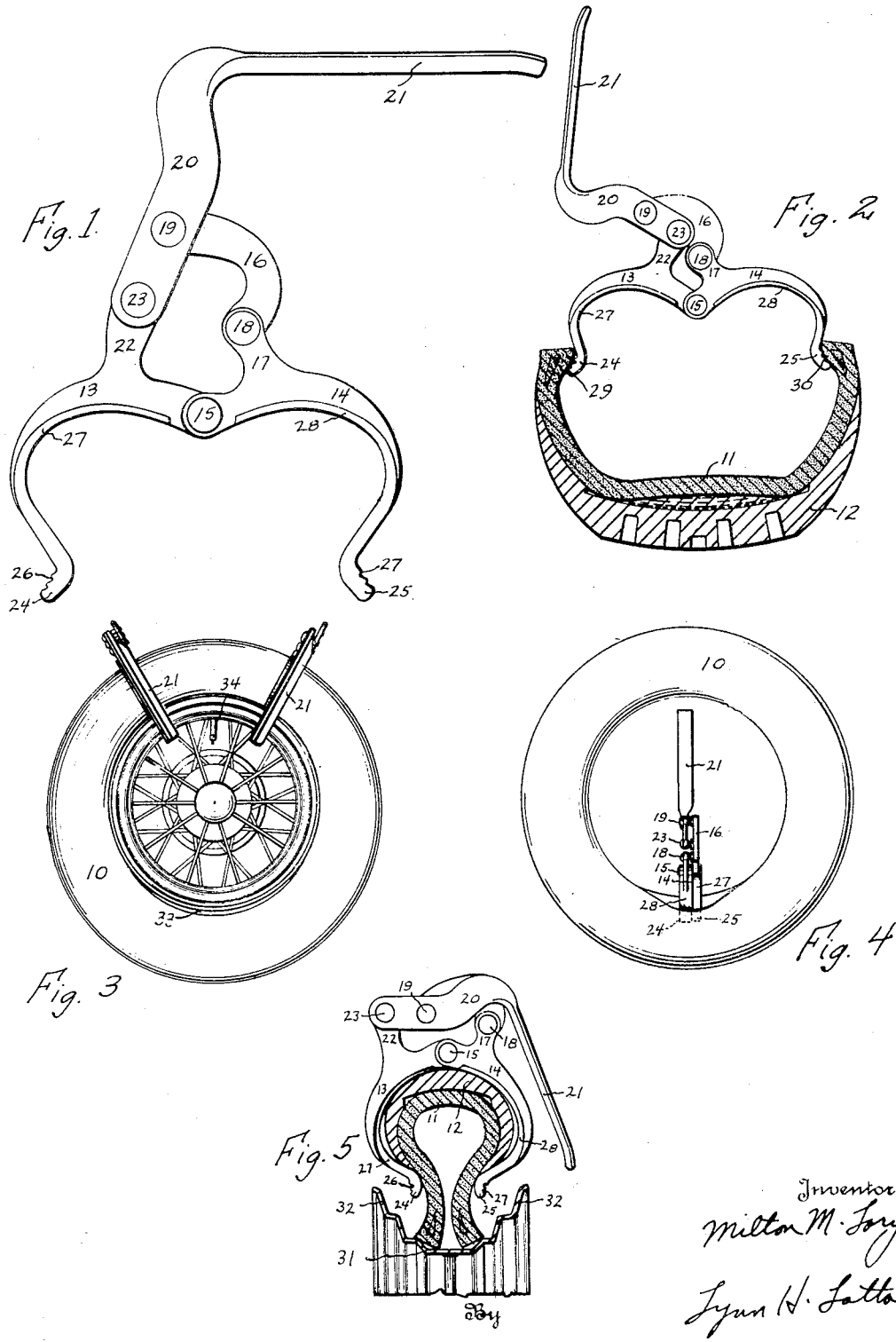

Patented Feb. 13, 1934

1,946,912

UNITED STATES PATENT OFFICE 1,946,912

TIRE TOOL

Milton Miles Lory, Sioux City, Iowa

Application February 12, 1932. Serial No. 592,513

1 Claim. (Cl. 152—27)

My invention relates to a tire tool particularly to be used with tire casings.

An object of my invention is to provide a tire tool which will open up the casing of a tire at the rims so that the inside of the tire can be inspected for nails or nail holes and so forth, without resorting to the necessity of using the present type of complicated machine.

A further object of my invention is to provide a small convenient tool which will allow an individual, at any time or place, to conveniently spread the casing apart in order to find the various damages done inside of the casing.

A further object of my invention is to provide a tool which besides functioning in the above mentioned manner, will also serve as a clamp to be used to remove tires using the "drop center" type of rim.

A further object of my invention is to provide a tool which will compress the tire suitably when used with this type of rim and will do so and secure the maximum amount of leverage so that the tire can be constricted quite readily and with a minimum of effort.

Another object of my invention is to provide such a tool which can be manufactured at a reasonable cost and which consists of a minimum of movable parts to achieve the results desired.

With these and other objects in view, my invention consists in the construction, arrangement, and combination of the various parts of my device whereby the objects contemplated are attained, as hereinafter more fully set forth, pointed out in my claim, and illustrated in the accompanying drawing, in which:

Figure 1 is a side view of the tool in its partially open position,

Figure 2 is a view of the tool when spreading a tire casing apart,

Figure 3 is a side view of two of the tools when used on the "drop center" type of rim, Figure 4 is a side view of the tool when used in the position as shown in Figure 2, and Figure 5 is a sectional detail view of the tool when it is constricting the casing in the "drop center" type of rim.

I have used the reference character 10 to designate the casing generally in which the inside fabric is indicated by 11 and the tread by 12.

The tool, itself, is made up of the arcuate members 13 and 14 which are pinned together by the pin 15, and the link 16 which is pinned to an extension 17 of the arcuate portions 14 at 18.

The upper part of the link is pinned at 19 to the lever 20, which lever includes the extended arm 21.

The lower end of the lever 20 is pinned to an extension 22 of the portion 13 by means of the pin 23.

The lower ends of the members 13 and 14 include the outwardly curving lips 24 and 25 which have the roughened surfaces 26 and 27 respectively on the outside.

To strengthen the members 13 and 14, I provide the ribs 27 and 28.

The entire tool is made up of malleable iron, and the pins are of steel.

The portions 27 and 28 are wider than the rest of the tool, and the handle 21 is approximately the same width as these portions as shown in Figure 4.

It will now be seen that when the handle 21 is pushed upwardly, that the ends 24 and 25 will tend to spread apart as shown in Figure 2.

The roughened portions 26 and 27 grip the inside of the casing at the points 29 and 30 and spread the casing apart at this point so that the inside surface of the casing can be examined. In this way, by passing around the inner periphery of the tire and successively inserting the tool and operating the arm as specified, the entire inside of the casing can be examined for nail holes, ruptures and the like.

When the handle 21 is swung approximately to the position as shown in Figure 2, it will be seen that the pivoted point 23 will lie within the arcuate link 16. If the member 16 were not arc-shaped as shown, there might be a tendency for the device to close up or the jaws to collapse inwardly. However by virtue of this link member 16 being shaped as shown, any force exerted in collapsing the jaws will have the tendency to force the arm 20 further outwardly. In other words by arranging the links in this fashion, the device automatically locks. The same locking feature is present when the device is closed as shown in Figure 5.

Of course when the handle 21 is again swung downwardly, the jaws 24 and 25 will close together.

Another use of my invention is illustrated in Figure 3 and Figure 5. (See Figure 5.)

A common type of rim now used is that as shown in Figure 5. This rim is the "drop center" type in which the center of the rim 31 is lower than the portions 32 of the rim which receive the casing when in its inflated condition.

After a puncture or a blowout, when practically all of the air is exhausted from the inner tube, the casing can be constricted as shown in Figure 5 at its upper portions by using either one tool or two tools, which is preferable as shown in Figure 3.

The tire is then constricted and the upper part of the casing will drop down to the lower portion 31 on the rim. In this way the lower portion of the casing 10 will be free of the rim as at 33, in Figure 3.

The tire can then be pulled off on the lower side of the rim first and then raised to allow the valve 34 to be freed from the rim and thence to allow the entire removal of the casing.

The tools can then be taken off. The inner tube has not been shown in Figure 5 merely to simplify the illustration.

It will be understood of course that during the operation shown in Figure 3, the automobile is jacked up in the usual manner.

It will be seen by using this tool in both manners, that the pivoting arrangement of the various levers will allow it to be used for both purposes with any size casing since there is an adjustment between the open jaws.

It will be also seen that the roughened portions 26 and 27 provide convenient grips on the inside of the casing when it is being spread.

The arm 21 is made of sufficient length to guarantee a strong leverage so that the tool can be operated effectively since the casing is generally made of comparatively rigid material so that a tool using a compound leverage as mine, will readily overcome the resistance thus encountered.

It will now be seen that I have provided a tool which can be used for spreading a tire casing or constricting the same for use in the "drop center" type of rim.

It will be seen further that I have provided such a tool which by its length and lever arrangements, insures a maximum strength to its functioning parts.

It will be further seen that I have provided a tool which is of comparatively simple and inexpensive construction.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

In a tire tool, means for spreading a tire casing comprising a pair of arcuate members pivotally connected and including outwardly extending lips at their lower portions, levered means for causing outward and inward movement of the arcuate members, said levered means including an arm and an arc-shaped link, the arm being pivotally connected to one of the arcuate members and the link to the other, the arm and the link being pivotally connected together with the arc-shaped link adapted to receive the pivotal connection between the arm and the arcuate member causing locking of the tool when fully opened, and a lengthened integral arm substantially at right angles to the arm.

MILTON M. LORY.